(12) United States Patent
Konishi et al.

(10) Patent No.: US 12,274,934 B2
(45) Date of Patent: Apr. 15, 2025

(54) CONTROLLER

(71) Applicant: Sony Interactive Entertainment Inc., Tokyo (JP)

(72) Inventors: Yukari Konishi, Tokyo (JP); Hitoshi Nakamura, Tokyo (JP); Yusuke Nakagawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 353 days.

(21) Appl. No.: 17/908,074

(22) PCT Filed: Mar. 25, 2020

(86) PCT No.: PCT/JP2020/013441
§ 371 (c)(1),
(2) Date: Aug. 30, 2022

(87) PCT Pub. No.: WO2021/192115
PCT Pub. Date: Sep. 30, 2021

(65) Prior Publication Data
US 2023/0099023 A1    Mar. 30, 2023

(51) Int. Cl.
*A63F 13/285* (2014.01)
*A63F 13/24* (2014.01)

(52) U.S. Cl.
CPC ............ *A63F 13/285* (2014.09); *A63F 13/24* (2014.09)

(58) Field of Classification Search
CPC ....... A63F 13/285; A63F 13/24; A63F 13/214
See application file for complete search history.

(56) References Cited

U.S. PATENT DOCUMENTS

| 5,643,087 | A | * | 7/1997 | Marcus | ................. | A63F 13/833 |
| | | | | | | 463/38 |
| 2007/0249422 | A1 | * | 10/2007 | Podoloff | ................. | G06F 3/048 |
| | | | | | | 463/43 |
| 2014/0125608 | A1 | | 5/2014 | Murata | | |
| 2014/0152542 | A1 | * | 6/2014 | Case | ....................... | G06F 3/033 |
| | | | | | | 345/156 |
| 2018/0299972 | A1 | | 10/2018 | Saito | | |
| 2020/0133427 | A1 | * | 4/2020 | Billington | ............... | F25B 21/04 |

FOREIGN PATENT DOCUMENTS

| JP | 2008258116 A | 10/2008 |
| JP | 2009109540 A | 5/2009 |
| JP | 2010086500 A | 4/2010 |
| JP | 2018088254 A | 6/2018 |
| JP | 2020027537 A | 2/2020 |

(Continued)

OTHER PUBLICATIONS

International Search Report for corresponding PCT Application No. PCT/JP2020/013441, 4 pages, dated Jun. 6, 2020.

(Continued)

*Primary Examiner* — James S. McClellan
(74) *Attorney, Agent, or Firm* — Kilpatrick Townsend & Stockton LLP (57) ABSTRACT

A controller includes a sensor that uses an elastically deformable elastic member, detects user's contact with or deforming action of the elastic member, and outputs an electric signal based on the detected contact or deforming action in question.

6 Claims, 5 Drawing Sheets

(56) References Cited

FOREIGN PATENT DOCUMENTS

KR  1020190041279 A  4/2019
WO  2012093725 A1  7/2012

OTHER PUBLICATIONS

Sungwon Lee, et.al.,"A strain-absorbing design for tissue-machine interfaces using a tunable adhesive gel," Nature Communications 5, DOI: 10.1038/ncomms6898, 8 pages, dated Dec. 19, 2014.
Notice of Reasons for Refusal for corresponding JP Application No. 2022-510235, 10 pages, dated Nov. 13, 2023.

* cited by examiner

CONTROLLER

TECHNICAL FIELD

The present invention relates to a controller.

BACKGROUND ART

Controllers used for such purposes as gaming typically include materials that are relatively difficult to deform such as plastics.

SUMMARY

Technical Problem

However, recent years have seen widespread use of technologies that present vibrations and force sensations in order to enrich user experiences in gaming and the like.

The present invention has been made in light of the above circumstances, and it is an object thereof to provide a controller capable of enriching haptic experiences.

Solution to Problem

An aspect of the present invention to solve the above problem of the conventional example is a controller that includes a sensor using an elastically deformable elastic member, and this sensor detects user's contact with or deforming action of the elastic member and outputs an electric signal based on the detected contact or deforming action in question.

Advantageous Effect of Invention

According to an example of the present invention, it is possible to enrich user's haptic experiences.

DESCRIPTION OF EMBODIMENT

[Basic Configuration]

Figure 1:
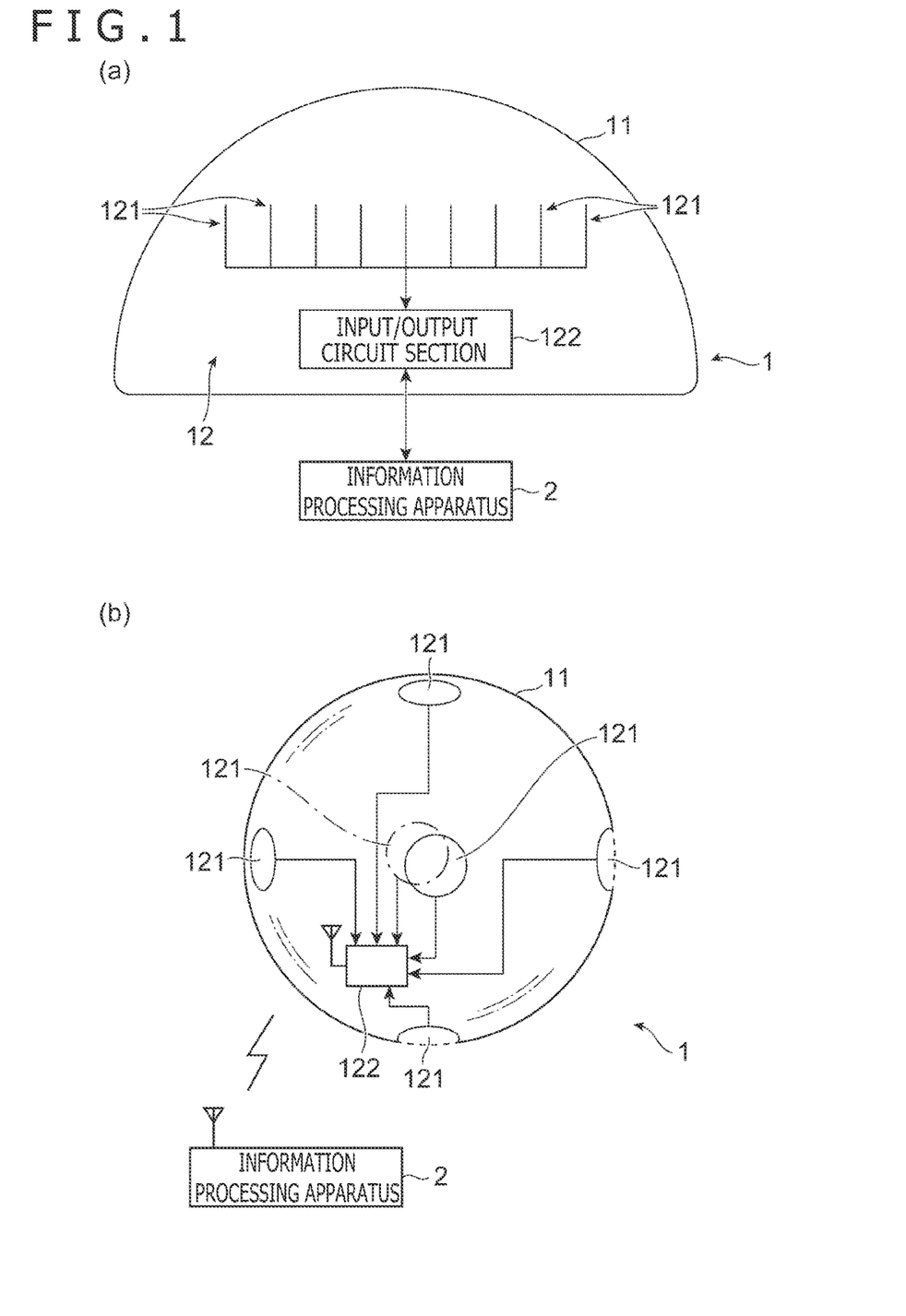
FIG. 1 depicts schematic diagrams illustrating a configuration example of a controller according to an embodiment of the present invention.

A description will be given of an embodiment of the present invention with reference to drawings. A controller 1 according to an example of the embodiment of the present invention includes an elastic member 11 and a circuit section 12 and is connected to an information processing apparatus 2 in a wired or wireless manner as illustrated in FIGS. 1(a) and 1(b). The circuit section 12 is included in the elastic member 11 or provided on a front surface of the elastic member 11.

It should be noted that a size and a shape of each of the sections illustrated, a ratio in size or length therebetween, and the like are for convenience of illustration, and the actual sizes, shapes, ratios, and the like may be different therefrom.

Here, the elastic member 11 includes an elastically deformable material such as a macromolecular gel material, examples of which are silicone-based macromolecular gel materials and urethane-based gel materials, and various elastomer materials, examples of which are polystyrene-based elastomer, olefin-based elastomer, polyvinyl chloride-based elastomer, polyurethane-based elastomer, polyester-based elastomer, and polyamide-based elastomer.

Also, the circuit section 12 includes a sensor 121 and an input/output circuit section 122. Here, the sensor 121 is a capacitive sensor, a pressure sensor, a strain sensor, an acceleration sensor, a temperature sensor, or the like that detects at least one given physical property. The sensor 121 detects user's contact with or deforming action of the elastic member 11 and outputs an electric signal based on the detected contact or deforming action in question to the input/output circuit section 122.

The input/output circuit section 122 is connected to the information processing apparatus 2 through a wired communication scheme such as a universal serial bus (USB) or a wireless communication scheme such as Bluetooth (registered trademark) and outputs to the information processing apparatus 2 information indicating the electric signal output from the sensor 121.

In an example of the present embodiment, the plurality of sensors 121 may be provided in the elastic member 11, for example, to detect not only deformation of the elastic member 11 but also the pressures applied to the sensors 121 and output signals indicating magnitudes and directions of the detected pressures or signals indicating states and magnitudes of the deformation. Here, the output signals may be values themselves of the signals in question output from the sensors 121. Alternatively, information indicating details and magnitude of the deformation may be generated and output by using a machine learning model that has machine-learned the details and magnitude of the deformation with regard to the signal values in question.

Also, in another example of the present embodiment, the sensor 121 may be provided on the front surface of the elastic member 11. Among examples of the sensor 121 as those described above are sensors and the like disclosed in Sungwon Lee, et. al., "A strain-absorbing design for tissue-machine interfaces using a tunable adhesive gel," Nacure Communications 5, doi: 19.1038/ncomms6898 and so on. Accordingly, widely known sensors can be adopted, and a detailed description thereof will be omitted here.

In the example of FIG. 1(b), for example, one sensor 121 is provided on the front surface of the substantially spheric elastic member 11 in each of six directions that are orthogonal to each other as viewed from a center of the elastic member 11 in question.

[Examples of Actions to be Detected]

If the controller 1 having this configuration is used, and when the user performs the following or other actions, i.e., (1) action of touching the elastic member 11,
(2) action of pressing in part of the elastic member 11 with a finger,
(3) action of twisting the elastic member 11,
(4) action of pinching (action of pinching and pulling) part of the elastic member 11,
(5) action of squashing or crushing the entire elastic member 11,
(6) action of bringing a hand close to the elastic member 11, and
(7) action of rubbing the front surface with a palm or a finger, it is possible to detect, for example, the (1) action of touching the elastic member 11 and the (6) action of bringing a hand close to the elastic member 11 by using capacitive sensors as the sensors 121. Alternatively, a conductive thread may be sewn into the elastic member 11 for use as the sensor 121, to detect the (1) action of touching the elastic member 11 and the (6) action of bringing a hand close to the elastic member 11 by detecting a capacitance change with this conductive thread.

Also, it is possible to detect the (2) action of pressing in part of the elastic member 11 with a finger, the (3) action of twisting the elastic member 11, the (4) action of pinching (action of pinching and pulling) part of the elastic member 11 which is specifically the action of pinching the elastic member 11 and pulling part thereof while holding the controller 1 including the elastic member 11 with one hand, the (5) action of squashing or crushing the entire elastic member 11, and the like by using pressure sensors, strain sensors, acceleration sensors, or the like as the sensors 121.

In this case as well, a conductive thread may be sewn into the elastic member 11 for use as the sensor 121, to detect various deformations by detection of a resistance change of this conductive thread.

Further, it is possible to detect the (7) action of rubbing the front surface with a palm or a finger by using strain sensors, capacitive sensors, or a conductive thread sewn into the elastic member 11 as the sensors 121, as described above.

[Home position] In an example of the present embodiment, the elastic member 11 has such elasticity that allows itself to return to a predetermined shape (hereinafter referred to as a natural shape) in a state where the user is not performing any action of (is not touching) the elastic member 11. Also, there are cases where one wishes to define up and down or left and right (or both thereof) for the controller 1 and, for example, distinguish between an action of pulling part of the left side of the elastic member 11 and an action of pulling part of the right side thereof.

Yet, the elastic member 11 has a problem in that, because it deforms elastically and changes in shape while an action is performed, it is difficult for the user to find what is generally called a home position (normally, the position where each finger such as a thumb is placed). In a case where one is unable to find the home position, it is difficult to define the up and down, left and right, and other directions of the controller 1.

For this reason, in an example of the present embodiment, the natural shape of the elastic member 11 may be asymmetric. For example, if the elastic member 11 is elliptical (what is generally called an egg-shaped) having, for example, a slightly thinner front, it becomes easy to recognize the up and down directions of the controller 1.

Figure 2:
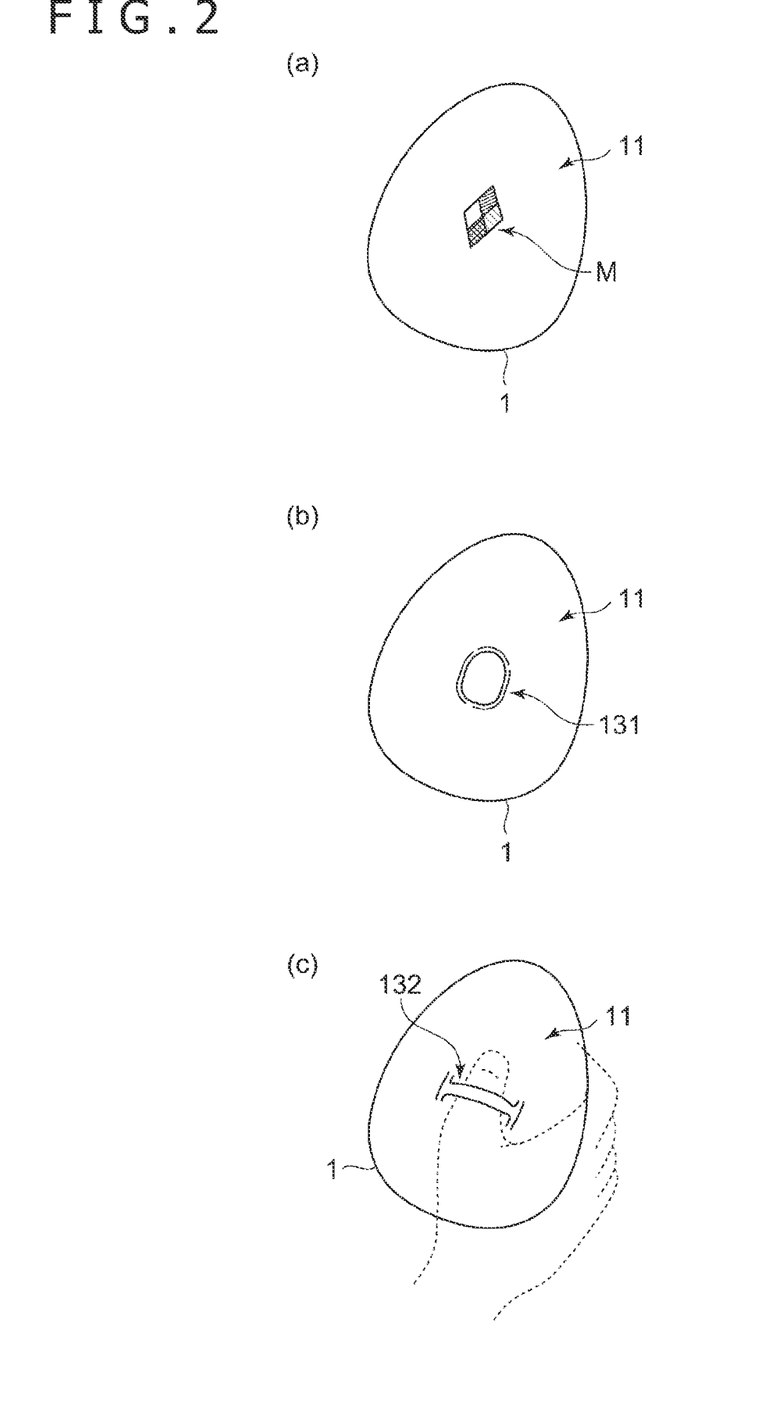
FIG. 2 depicts explanatory diagrams illustrating an example of a guide in an elastic member of the controller according to the embodiment of the present invention.

Also, a marker M indicating a position where a given finger such as a thumb is to be placed (referred to as a prescribed position) may be provided at the position in question of the elastic member 11. This marker M may be some kind of pattern or the like printed at the prescribed position on the front surface of the elastic member 11 as illustrated in FIG. 2 (FIG. 2(*a*)). Here, the pattern of the marker M may be asymmetrical in shape, color scheme between different sections, or the like to allow the user to recognize given directions such as front and back or left and right.

Further, this marker M may include a material having a sense of touch different from those of other portions. For example, the portion of the marker M of the elastic member 11 may be embossed unlike other portions to provide a rough sense of touch. Alternatively, projections and recesses may be formed in the portion of the marker M in question. The projections and recesses in question may be braille letters.

Also, a member (guide member) 131 in a given shape (e.g., ring shape) having relatively lower elasticity than the elastic member 11 may be embedded at a relatively shallow position close to the prescribed position on the front surface of the elastic member 11 (FIG. 2(*b*)).

Further, a guide member 132 which is a shaped portion that allows a given finger of the user to be guided to the position to be touched by the finger such as a ring through which a corresponding finger is to be passed may be formed at the prescribed position on the front surface of the elastic member 11 (FIG. 2(*c*)).

Figure 3:
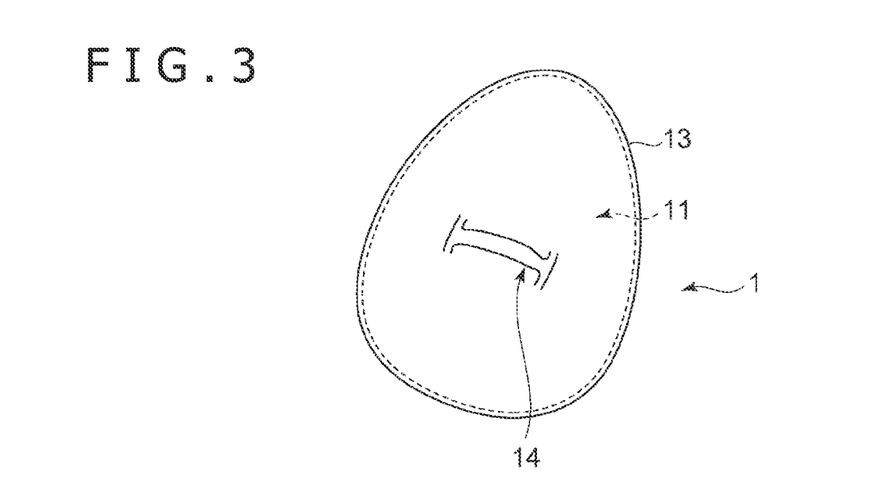
FIG. 3 is an explanatory diagram illustrating a formation example of a guide member in the elastic member of the controller according to the embodiment of the present invention.

Also, the elastic member 11 may be covered with a cover 13 that includes a stretchy material such as rubber instead of having the guide member embedded into the elastic member 11 itself or the elastic member 11 deformed. In this example, the guide member is provided at the position of the cover 13 in question in contact with the prescribed position, or a ring-shaped support 14 through which a corresponding finger is to be passed may be formed on an outer side surface corresponding to the position in contact with the prescribed position in question (FIG. 3). In this example, the user grips the controller 1 by passing the finger to be placed at the prescribed position through the support 14.

Further, in a case where a ring-shaped portion through which a finger is to be passed is provided as in this example, the controller 1 can detect an action of deforming the elastic member 11 by raising the finger that is passed through the ring-shaped portion (an action of making what is generally called a "thumbs up" motion in a case where the thumb is passed).

According to this example, it is possible to detect the directions of deformation such as the direction in which the elastic member 11 is pushed and the direction in which the elastic member 11 is pulled, an amount and speed of deformation, and the like, making it possible for the information processing apparatus 2 to accept information indicating these actions and control the direction, amount, and speed of travel and the like of a three-dimensional object in a game space in reference to the information in question.

[Tearing-Off and Sticking Actions]

Also, the number of circuit sections 12 to be provided in the elastic member 11 may not be one. Actions of separating the elastic member 11 into portions each of which includes at least one circuit section 12 by tearing the portions off or sticking the separated elastic member 11 together and restoring them to the original form (joining) may be made recognizable by providing the plurality of circuit sections 12 in the elastic member 11. Self-healing materials such as those described in Ryota Tamate, et. al., "Self-Healing Micellar Ion Gels Based on Multiple Hydrogen Bonding," Advanced Materials, DOI: 10.1002/adma.201802792 may be used as the elastic member 11 described above.

In this example, the circuit sections 12 in the elastic member 11 may communicate with each other to recognize separation and joining according to a change in distance therebetween.

[Feedback]

Further, in the present embodiment, the circuit section 12 may perform such control as to change the shape, an elastic modulus, hardness, or temperature of the elastic member 11 or vibrate the elastic member 11 together with or in place of detecting the actions of deforming the elastic member 11 and the like.

In this example, for example, a functional fluid such as a magnetic fluid (MR fluid) or an electrorheological fluid (ER fluid) is mixed in advance into the material of the elastic member 11. Also, an external field application section (e.g., electrode plate or electromagnet) that applies an electric or magnetic field may be provided in the circuit section 12 to apply an electric or magnetic field to the elastic member 11 with this external field application section and change the shape of the elastic member 11 by controlling the MR fluid or ER fluid. That is, in this example, the circuit section 12 functions as an example of a shape control section of the present invention.

Also, in another example, a bubble in which gas (e.g., air) is sealed may be mixed in advance into the material of the elastic member 11. In this example, the circuit section 12 may include a temperature control apparatus such as a Peltier element that controls temperature, to change the temperature of the elastic member 11 with the temperature control apparatus in question, thereby control a gas volume in the bubble, and change the shape of the elastic member 11.

Also, the elastic member 11 may include such a material as gel whose elastic modulus or hardness changes under heat, to control the elastic modulus or hardness by change of the temperature with the above temperature control apparatus.

In these examples, the circuit section 12 has the plurality of external field application sections or temperature control apparatuses provided in each section of the elastic member 11 and sets the direction and a strength of an external field applied by each external field application section or the temperature presented by each temperature control apparatus in accordance with an instruction input from the information processing apparatus 2.

Also, a temperature control apparatus such as a Peltier element capable of electrically changing temperature may be provided on the front surface of, or inside the elastic member 11, and the circuit section 12 may set the temperature presented by the temperature control apparatus in accordance with an instruction input from the information processing apparatus 2. In this example, the information processing apparatus 2 receives information indicating user's contact with or deforming action or the like of the elastic member 11, generates information indicating the temperature to be presented to the user, and sends the information to the controller 1. Then, the circuit section 12 of the controller 1 controls the temperature control apparatus such as a Peltier element to present the temperature indicated by the information input from the information processing apparatus 2 in question.

It should be noted that the circuit section 12 may set the temperature presented by the temperature control apparatus in response to a signal indicating the details of user's contact with or deforming action of the elastic member 11 detected by the sensor 121 in place of or together with an instruction input from the information processing apparatus 2. In this case, when the user deforms the controller 1, the temperature control apparatus such as a Peltier element provided in the elastic member 11, for example, is controlled to present the preset temperature corresponding to the deformation in question. For example, the temperature control apparatus may be controlled such that the larger the amount of deformation, the higher the temperature becomes. This allows the user to feel the temperature change corresponding to deformation.

Further, if the elastic member 11 having relatively high thermal conductivity is used in various examples using these temperature control apparatuses, it is possible to transfer the temperature presented by the temperature control apparatus to the front surface side of the elastic member 11 relatively close to the temperature control apparatus, which allows communication of sense of hotness and coldness to the user.

Also, in a case where the elastic member 11 is vibrated, the circuit section 12 including a driving section such as a vibrator is provided in the elastic member 11. It should be noted that, considering that the elastic member 11 may accidentally function as a vibration absorbing material, the vibrator may be provided at a relatively shallow position from the front surface of the elastic member 11. That is, the elastic member 11 may be formed relatively thin at the position where the vibrator is provided.

Also, in another example, a vibrator of a type capable of producing, at relatively high intensity, a vibration whose frequency is readily absorbable by the elastic member 11 may be selected and used to suit the material of the elastic member 11.

[Combination with a Conventional Controller]

Figure 4:
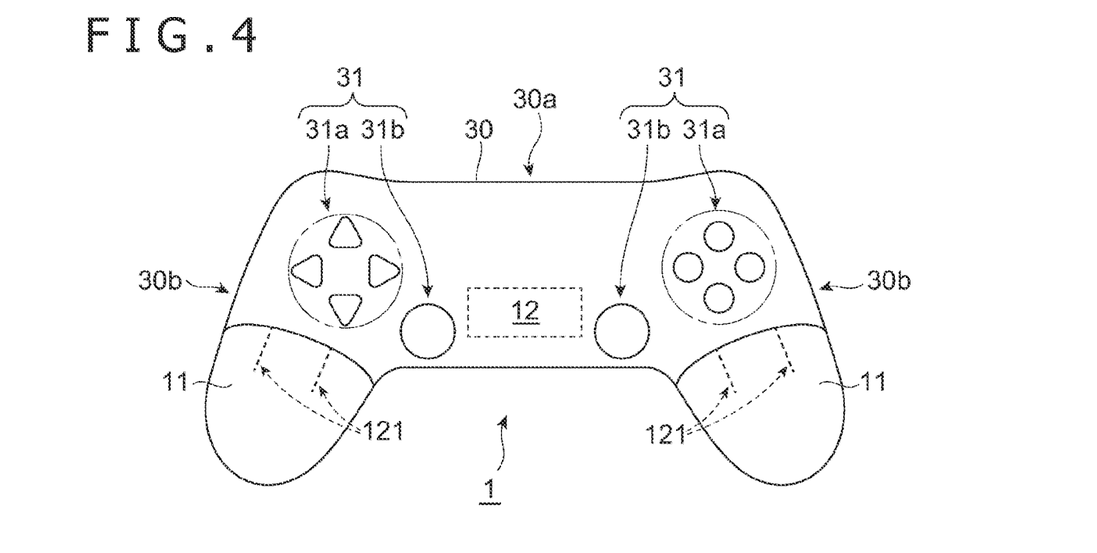
FIG. 4 is a schematic external view illustrating an example of the controller according to the embodiment of the present invention.

Also, in the present embodiment, the controller 1 may include a housing section 30 and action sections 31 similar to those of a conventional controller as illustrated in FIG. 4 with the elastic member 11 provided in some portions thereof. In this example, although the circuit section 12 may be provided in the housing section 30, sensors 121, external field control sections, temperature control apparatuses, vibrators, actuators, and the like are provided inside or in contact with the elastic member 11.

In the example of FIG. 4, the housing section 30 includes the action sections 31 on the front surface of a main body section 30a which is approximately rectangular, and the action sections 31 each include, for example, buttons 31a, a joystick 31b, and the like. A gripping section 30b extends from each of left- and right-side edge portions of the main body section 30a to the front. FIG. 4 illustrates an example in which one elastic member 11 is provided on the front side of each of the left and right gripping sections 30b.

In this example, the user performs a twisting, pulling, bending, or other action on the elastic members 11. The circuit section 12 detects not only user's actions on the action section 31 but also user's actions on the elastic members 11 (e.g., deformation of the elastic members 11), generates information indicating the details of the detected actions in question, and outputs the information to the information processing apparatus 2.

Also, if the circuit section 12 of the controller 1 described above performs such control as to change the shape, elastic modulus, hardness, or temperature of the elastic members 11 or vibrate the elastic members 11, it becomes possible to change the shape of the grips to the one reflecting the user's preferred hardness, thickness, and the like set for each user. Also, the shape or hardness of the portions of the elastic members 11 (grips) changes in response to a process performed by the information processing apparatus 2 such as a game, which makes it possible, for example, to present the material of a virtual object in a game space to the user as a haptic sensation, present the temperature of the virtual object as a warm/cold sense, or the like.

Figure 5:
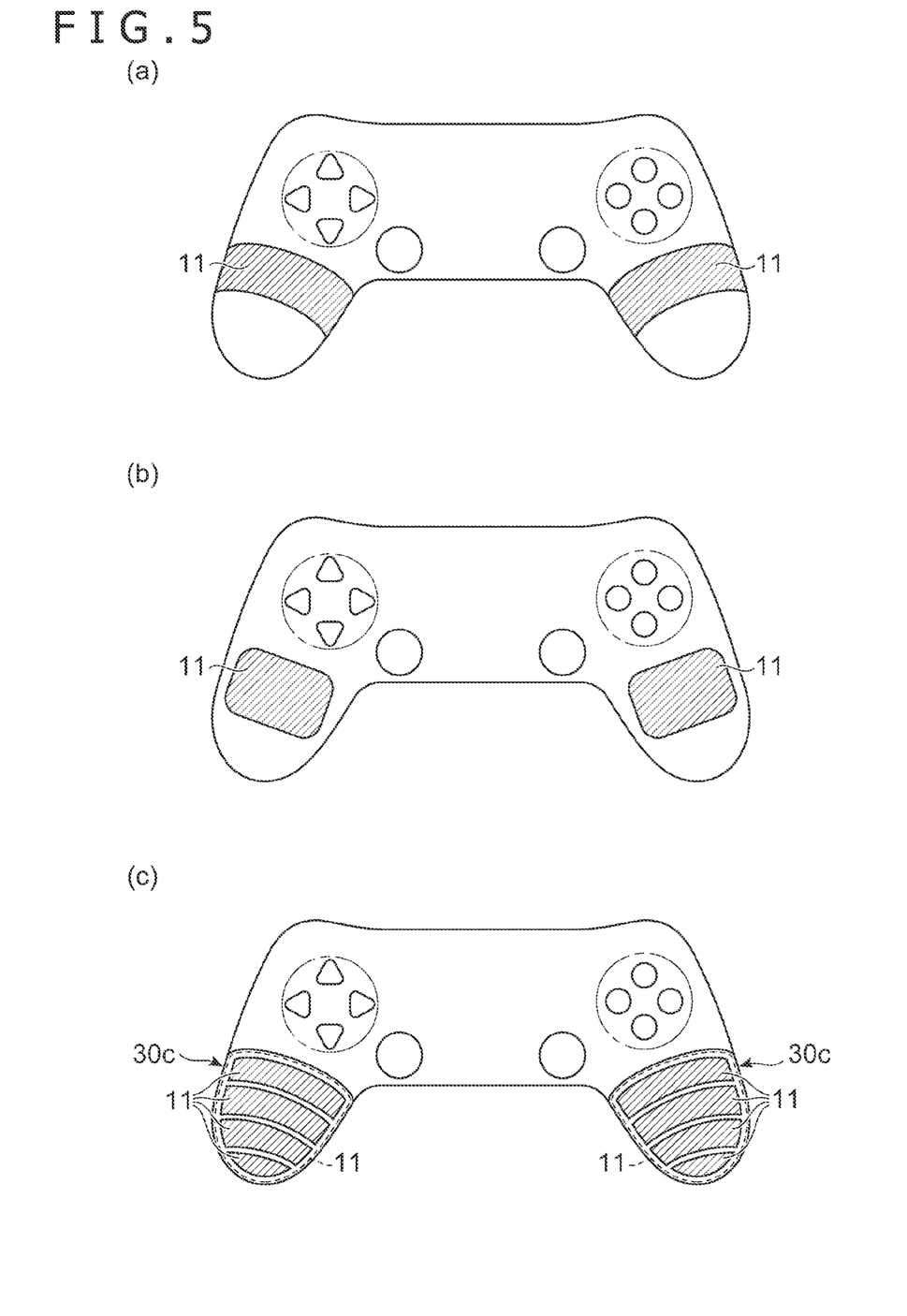
FIG. 5 depicts a set of explanatory diagrams illustrating an example of arrangement of the elastic member in the controller according to the embodiment of the present invention.

Further, in this example of the present embodiment, as illustrated in FIG. 5, part of each of the gripping sections 30b may include the elastic member 11 (FIG. 5(a)), or the elastic member 11 may be provided in such a manner as to be exposed on the front surface of each of the gripping sections 30b (FIG. 5(b)) rather than using the front side of the gripping section 30b in whole as the elastic member 11. Also, frames 30c (frame bodies) may be formed to prevent the elastic members 11 from being removed from the main body of the controller 1. In this example, the elastic member 11 is accommodated in each of the frames 30c to allow the user to not only touch the elastic member 11 via an opening portion of the frame body and perform a pressing, pulling, or other action of the elastic member 11 but also perceive the deformation, change in elastic modulus, hardness, or temperature, vibration, or the like of the elastic member 11 (FIG. 5(c)).

According to these examples of FIG. 5, it is more likely for the shapes of the elastic members 11 to be maintained constant than when the front sides of the gripping sections 30b in whole are used as the elastic members 11, which makes it possible to grip the gripping sections 30b with ease and perform actions on the elastic members 11.

Figure 6:
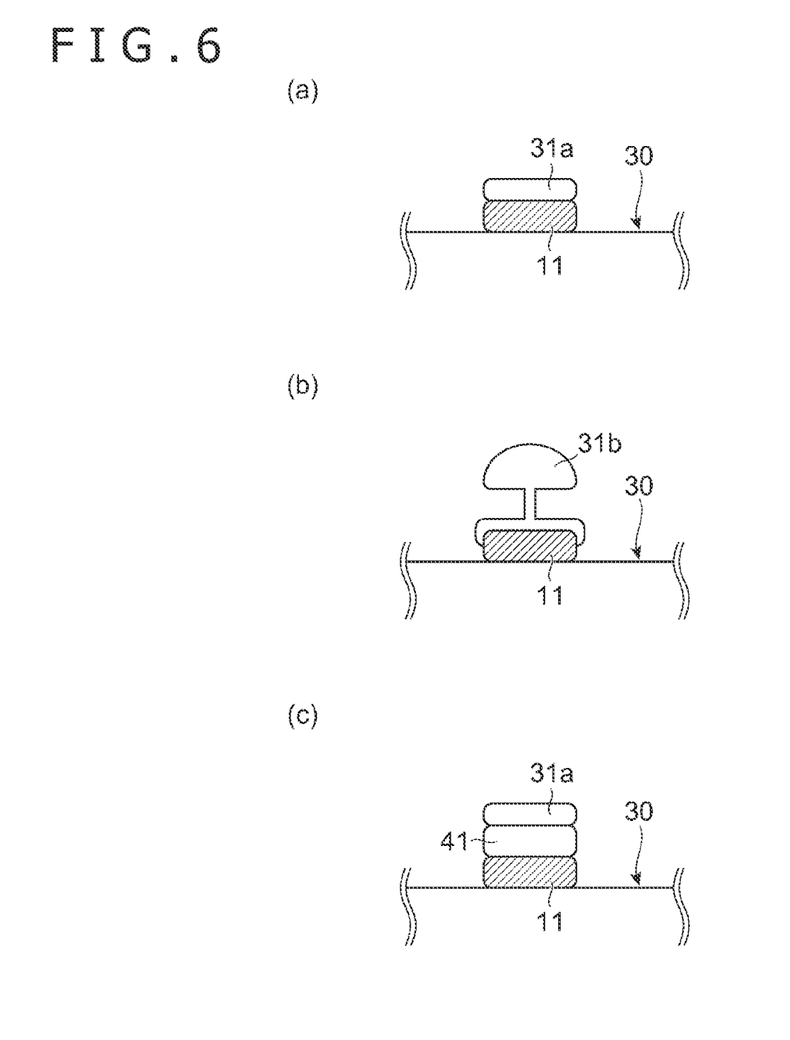
FIG. 6 depicts another set of explanatory diagrams illustrating an example of arrangement of the elastic member in the controller according to the embodiment of the present invention.

Also, in another example, the elastic member 11 of the controller 1 may be provided to lie between the housing section 30 (base member) and an action member such as button top (FIG. 6(a)) of the button 31a or stick (FIG. 6(b)) of the joystick 31b as illustrated in FIG. 6. It is assumed here that the housing section 30 and the action members include materials having relatively lower elastic moduli than that of the elastic member 11.

In this example, the circuit section 12 of the controller 1 detects the deformation of the elastic member 11 resulting from a user's action (e.g., pressing down, moving, pulling, tilting) on an action member and sends information indicating the details of the detected deformation in question to the information processing apparatus 1.

Also, in a case where the elastic member 11 lies between the housing section 30 which is the base member and an action member such as a button top as described above, a stacked body in which the elastic member 11 and a vibration member 41 including a vibrator or the like are stacked in this order is provided on top of the housing section 30, after which an action member (31a) is provided on top of the stacked body (FIG. 6(c)). It should be noted that wiring from the circuit section 12 provided in the housing section 30 to the vibration member may penetrate the elastic member 11.

In this example, the circuit section 12 performs control in such a manner as to vibrate the vibration member in accordance with an instruction input from the information processing apparatus 2. According to this example, when the vibration member 41 vibrates, the vibration is directly transferred without being attenuated because there is no elastic member 11 lying between the vibration member 41 and the action member. Meanwhile, the vibration is attenuated first and then transferred to the side of the housing section 30 where the elastic member 11 lies between the vibration member 41 and the housing section 30. Accordingly, it is possible to prevent a phenomenon such as occurrence of unnecessary sound resulting from vibration of the housing.

Also, in a case where the elastic member 11 is provided between the housing section 30 which is the base member and an action member as described above, the shape, elastic modulus, hardness, or temperature of the elastic member 11 may be changed under control of the circuit section 12 in accordance with an instruction input from the information processing apparatus 2. According to these examples, it is possible to present a force sensation or warm/cold sense to the user who is performing an action on an action member.

Modification Example

Also, the shape of the elastic member 11 may be controlled not only by mixing a functional fluid or the like as described above but also providing an artificial muscle or soft actuator in the elastic member 11 or suturing an artificial muscle or soft actuator into the front surface of the elastic member 11. Also, the substance mixed into the material of the elastic member 11 may be conductive and thermally conductive such as carbon, silver, or copper.

Further, the substance mixed into the material of the elastic member 11 may change its color, for example, under heat. In this example, the circuit section 12 includes a temperature control apparatus and controls the temperature of the elastic member 11.

Also, examples of feedback are not limited to those described so far, and there can be various modification examples such as performing control to emit light, performing control to produce a sound, and performing control to pass a current.

Also, the material of the elastic member 11 need only be selected from the viewpoint of whether or not it has anti-vibration/vibration control/shock absorbing performance, conductivity, magnetic permeability, thermal conductivity, heat resistance, waterproof/dustproof performance, insulating performance, flame retardance, and the like. According to the present embodiment, it is possible to enrich haptic experiences.

REFERENCE SIGNS LIST

1: Controller
2: Information processing apparatus
11: Elastic member
12: Circuit section
13: Cover
14: Support
30: Housing section
31: Action section
41: Vibration member
121: Sensor
122: Input/output circuit section
131, 132: Guide member

The invention claimed is:

1. A controller comprising:
an elastic member comprising an elastically deformable material;
one or more sensors, the one or more sensors being configured to detect a user's contact with or a deforming action of the elastic member and output one or more electric signals based on the user's contact and/or the deforming action; and
a circuit section configured to control of a shape of the elastic member based on the electric signal, wherein the circuit section is configured to control the shape of the elastic member by applying an electric or magnetic field to the elastic member, controlling a gas volume in a gas bubble of the elastic member, or changing a temperature of the elastic member.

2. The controller according to claim 1, wherein the controller further comprises a guide member that is provided on a front surface of the elastic member to guide a given finger of the user to a position to be touched by the finger.

3. The controller according to claim 1, wherein a shaped portion is provided on a front surface of the elastic member to guide a given finger of the user to a position to be touched by the finger.

4. The controller according to claim 1, wherein
the circuit section is connected to an information processing apparatus to which the electric signal is output,
the circuit section being configured to deform the elastic member in response to a signal input from the information processing apparatus.

5. A controller comprising:
an elastic member comprising an elastically deformable material;
one or more sensors, the one or more sensors being configured to detect a deforming action of the elastic member and output one or more electric signals based on the deforming action; and
a temperature control section
configured to change a temperature of the elastic member based on the one or more electric signals, wherein the temperature control section is configured to increase the temperature of the elastic member in response to an increase in an amount that the elastic member is deformed.

6. A controller comprising:
a sensor using an elastically deformable elastic member, the sensor being configured to detect user's contact with or deforming action of the elastic member and output an electric signal based on the user's contact or the deforming action, wherein the elastic member lies between a plurality of members having relatively low elastic moduli, the plurality of members being configured to detect deformation of the elastic member resulting from a user's action on the plurality of members and to output an electric signal based on the deformation, the plurality of members having relatively low elastic moduli comprising a base member and an action member, wherein a stacked body in which an elastic member and a vibration member are stacked in sequence is provided on top of the base member, and an action member is provided on top of the stacked body, and wherein the vibration member vibrates in response to a signal input from an information processing apparatus, and a vibration of the vibration member is transferred to the elastic member; and
a temperature control section configured to change a temperature of the elastic member according to an electric signal output from the sensor.

* * * * *